(12) United States Patent
Shu et al.

(10) Patent No.: US 11,798,448 B1
(45) Date of Patent: Oct. 24, 2023

(54) NEAR-EYE DISPLAY DEVICE

(71) Applicant: Wei Shu, Guangdong (CN)

(72) Inventors: Wei Shu, Guangdong (CN); Manli Guo, Guangdong (CN); Xiaoguang He, Guangdong (CN)

(73) Assignee: Wei Shu, Guangzhou (CN)

( * ) Notice: Subject to any disclaimer, the term of this patent is extended or adjusted under 35 U.S.C. 154(b) by 0 days.

(21) Appl. No.: 17/950,092

(22) Filed: Sep. 21, 2022

(30) Foreign Application Priority Data

Apr. 2, 2022 (CN) .......................... 202210341779.8
Aug. 31, 2022 (CN) .......................... 202211063034.6

(51) Int. Cl.
*G02B 27/01* (2006.01)
*G02B 26/10* (2006.01)
*G09G 3/02* (2006.01)

(52) U.S. Cl.
CPC ............... *G09G 3/02* (2013.01); *G02B 26/10* (2013.01); *G02B 27/0172* (2013.01)

(58) Field of Classification Search
CPC ............ G02B 27/0172; G02B 27/0176; G02B 2027/0178; G02B 26/105; G02B 26/10; G02B 26/0833; G02B 27/0101; G02B 2027/0123; G02B 26/101; G09G 3/02; G09G 3/025
See application file for complete search history.

(56) References Cited

U.S. PATENT DOCUMENTS 11,262,580 B1 * 3/2022 Topliss ................. G02B 26/101
2017/0285343 A1 * 10/2017 Belenkii ............... H04N 13/344
2018/0246336 A1 * 8/2018 Greenberg ........... G02B 27/0176

FOREIGN PATENT DOCUMENTS

CN          109655014 A  *  4/2019  ........... G01B 11/254

* cited by examiner

*Primary Examiner* — Xuemei Zheng

(57) ABSTRACT

The present disclosure provides a near-eye display device. The near-eye display device includes: a light source module and an optical module, where the light source module includes multiple laser image sources, which are vertical-cavity surface-emitting laser (VCSEL) image sources or collimated light image sources; the light source module is configured to: perform digital-to-analog (D-A) conversion on an image signal and load the image signal into the laser image sources, such that the laser image sources emit red, green, and blue (RGB) laser beams; the optical module includes a compound eye control chip and a projection element array; the projection element array includes multiple projection elements, which are arranged on the compound eye control chip according to a preset arrangement pattern; and the optical module is configured to: control the projection elements to rotate within a preset angle through the compound eye control chip.

6 Claims, 7 Drawing Sheets

NEAR-EYE DISPLAY DEVICE

CROSS REFERENCE TO RELATED APPLICATIONS

The present application claims the benefit of Chinese Patent Application Nos. 202210341779.8 filed on Apr. 2, 2022 and 202211063034.6 filed on Aug. 31, 2022. All the above are hereby incorporated by reference in their entirety.

TECHNICAL FIELD

The present disclosure relates to the technical field of near-eye display, and in particular to a near-eye display device.

BACKGROUND

With the advancement of display technologies and people's pursuit of high technologies, near-eye display technologies including virtual reality (VR), augmented reality (AR) and mixed reality (MR), etc., have been widely used in various fields of work and life. The near-eye display device is typically worn on the user's eyes in the form of glasses. That is, the display screen is placed close to the user's eyes, allowing the user to roam in the virtual world or the virtual-real world.

At present, the light beam of the near-eye display device needs to undergo multiple times of reflection or refraction before being projected to the eyes, resulting in a bulky display device. In addition, after multiple times of reflection or refraction, the comprehensive angle error of the light beam is relatively large, resulting in poor user experience.

SUMMARY

The present disclosure provides a near-eye display device, which solves the technical problem that the existing near-eye display device has an excessively large volume and a large beam projection angle error which results in poor user experience.

An embodiment of the present disclosure provides a near-eye display device, including:
a light source module and an optical module, where
the light source module includes multiple laser image sources, which are vertical-cavity surface-emitting laser (VCSEL) image sources or collimated light image sources;
the light source module is configured to: perform digital-to-analog (D-A) conversion on an image signal and load the image signal into the laser image sources, such that the laser image sources emit red, green, and blue (RGB) laser beams;
the optical module includes a compound eye control chip and a projection element array;
the projection element array includes multiple projection elements, which are arranged on the compound eye control chip according to a preset arrangement pattern, where the projection elements adopt 3D scanning mechanisms; and
the optical module is configured to: separately control the projection elements to rotate within a preset angle through the compound eye control chip, so as to project the RGB laser beams emitted by the laser image sources to a user's eye through the projection elements.

Further, the light source module and the optical module may be arranged separately; and the projection elements may project the RGB laser beams emitted by the laser image sources to the user's eye by means of light reflection.

Further, the light source module and the optical module may be arranged integrally; and the projection elements may project the RGB laser beams emitted by the laser image sources to the user's eye by direct emitting.

Further, the projection elements and the laser image sources may have a one-to-many correspondence.

Further, the compound eye control chip may include a base and a control circuit; and the control circuit may be prepared on the base.

Further, the preset arrangement pattern may include an equilateral triangle, a square and a rectangle.

Further, the preset angle may be 0-180°.

In the near-eye display device provided by the embodiment of the present disclosure, the laser image sources of the light source module emit the RGB laser beams. The compound eye control chip controls the deflection angles of the projection elements, so as to project the RGB laser beams emitted by the laser image sources to the eye of the user through the projection elements. The laser beams do not need to undergo multiple times of reflection or refraction before reaching the human eye, which greatly reduces the volume of the near-eye display device and reduces the beam projection angle error, thereby effectively improving the user experience.

DETAILED DESCRIPTION

The technical solutions in the embodiments of the present disclosure are clearly and completely described below with reference to the drawings in the embodiments of the present disclosure. Apparently, the described embodiments are merely some rather than all of the embodiments of the present disclosure. All other embodiments obtained by those of ordinary skill in the art based on the embodiments of the present disclosure without creative efforts should fall within the protection scope of the present disclosure.

In the description of the present disclosure, it should be understood that terms such as "first" and "second" are used merely for a descriptive purpose, and should not be construed as indicating or implying a relative importance, or implicitly indicating the number of indicated technical features. Thus, features defined with "first" and "second" may explicitly or implicitly include one or more of the features. In the description of the present disclosure, unless otherwise specified, "multiple" means two or more.

In the description of the present disclosure, it should be noted that, unless otherwise clearly specified, meanings of terms "install", "connected with", and "connected to" should be understood in a board sense. For example, the connection may be a fixed connection, a removable connection, or an integral connection; may be a mechanical connection or an electrical connection; may be a direct connection or an indirect connection by using an intermediate medium; or may be intercommunication between two components. Those of ordinary skill in the art should understand the specific meanings of the above terms in the present disclosure based on specific situations.

Figure 1:
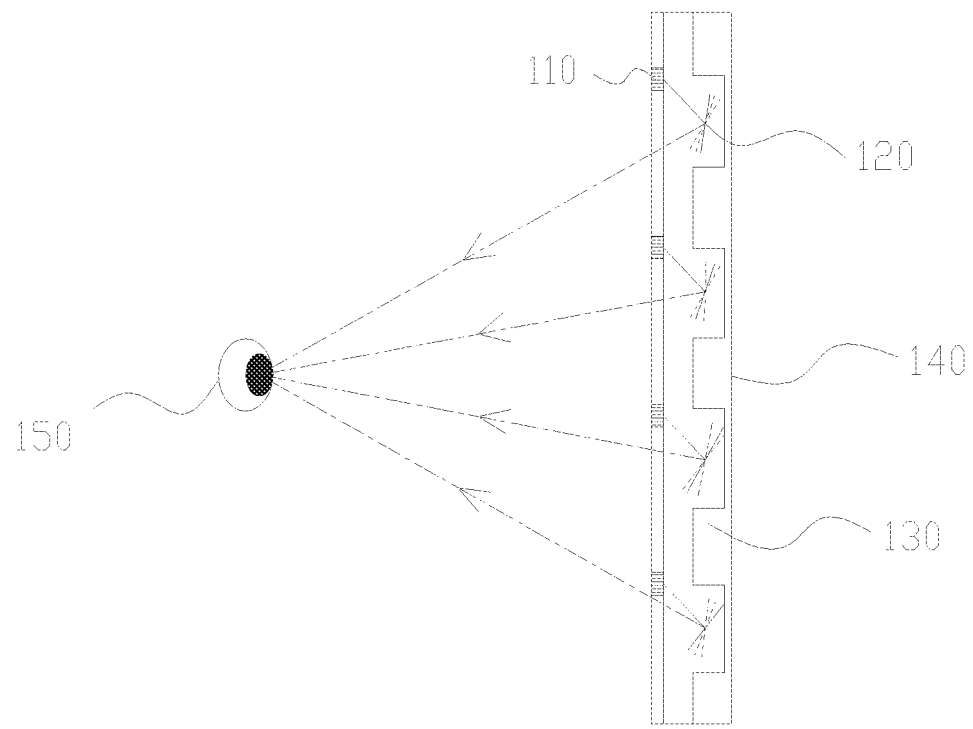
FIG. 1 is a first structural diagram of a near-eye display device with a light source module and an optical module arranged separately according to an embodiment of the present disclosure.
Figure 2:
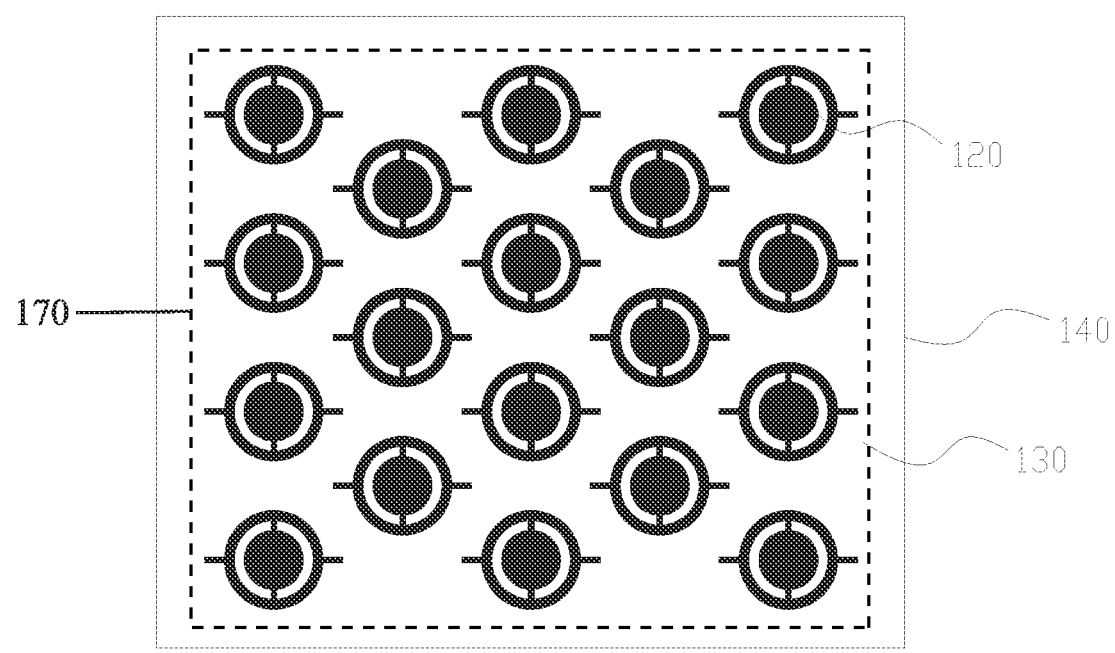
FIG. 2 is a structural diagram of the optical module according to an embodiment of the present disclosure.
Figure 3:
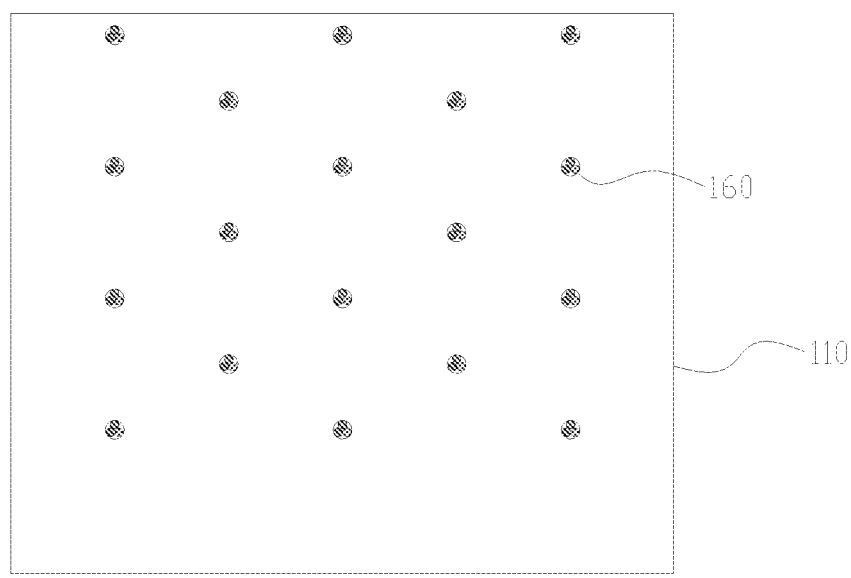
FIG. 3 is a structural diagram of the light source module according to an embodiment of the present disclosure.
Figure 4:
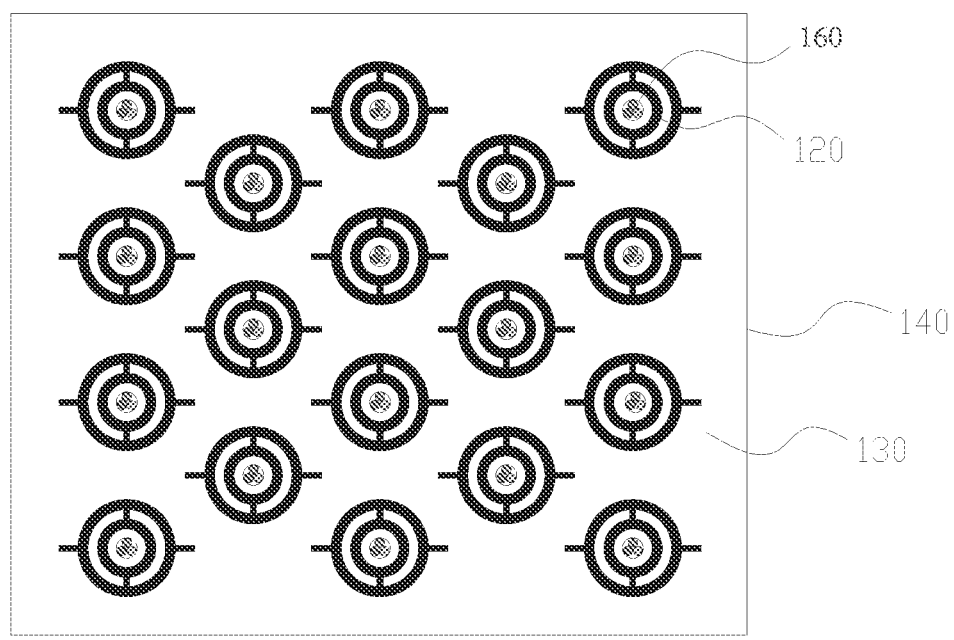
FIG. 4 is a first structural diagram of a near-eye display device with a light source module and an optical module arranged integrally according to an embodiment of the present disclosure.
Figure 5:
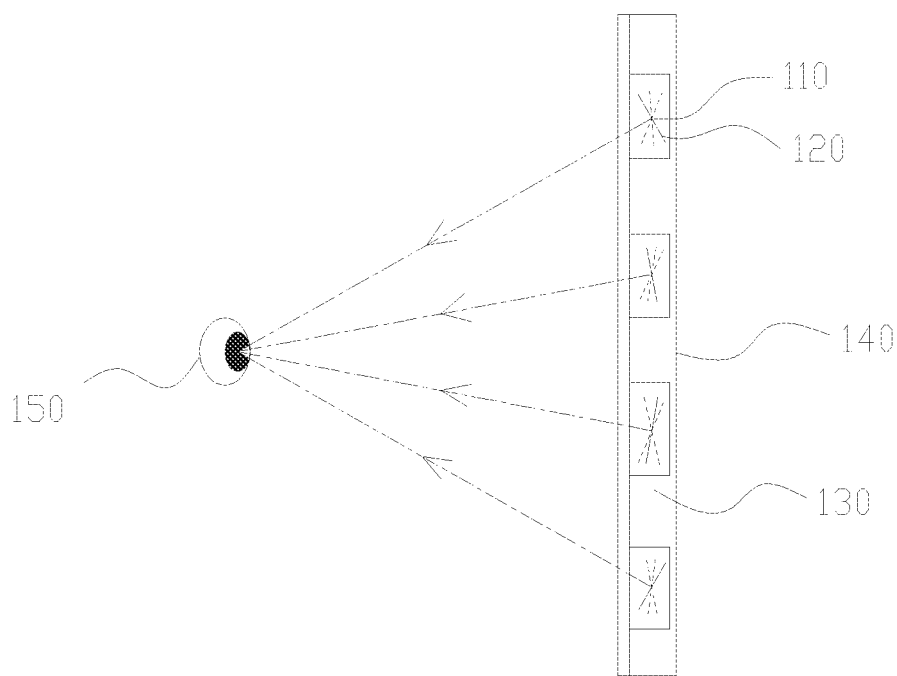
FIG. 5 is a second structural diagram of the near-eye display device with the light source module and the optical module arranged integrally according to an embodiment of the present disclosure.
Figure 6:
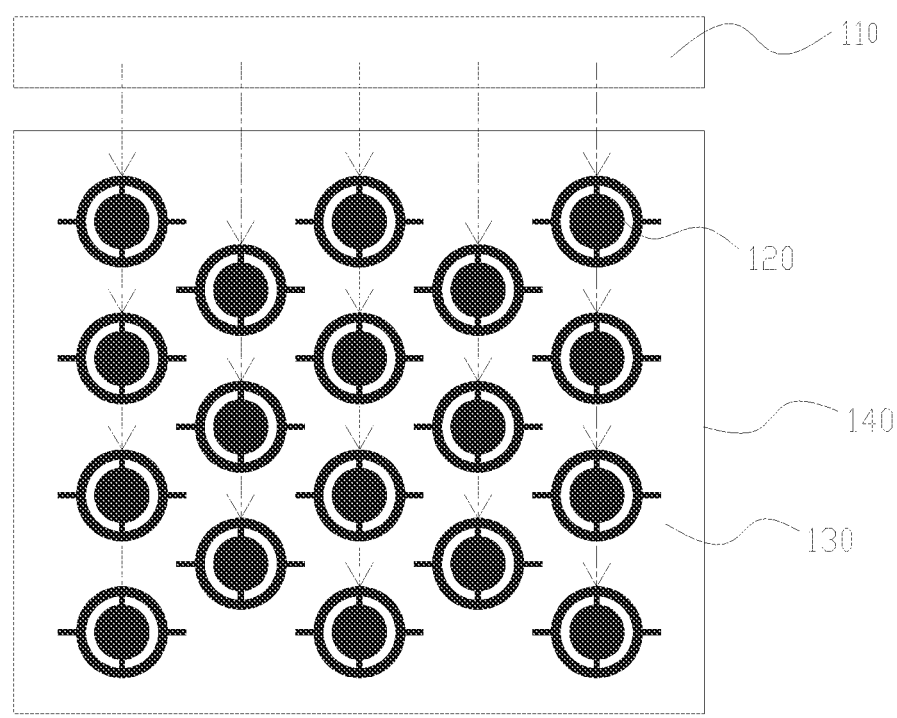
FIG. 6 is a second structural diagram of the near-eye display device with the light source module and the optical module arranged separately according to an embodiment of the present disclosure.
Figure 7:
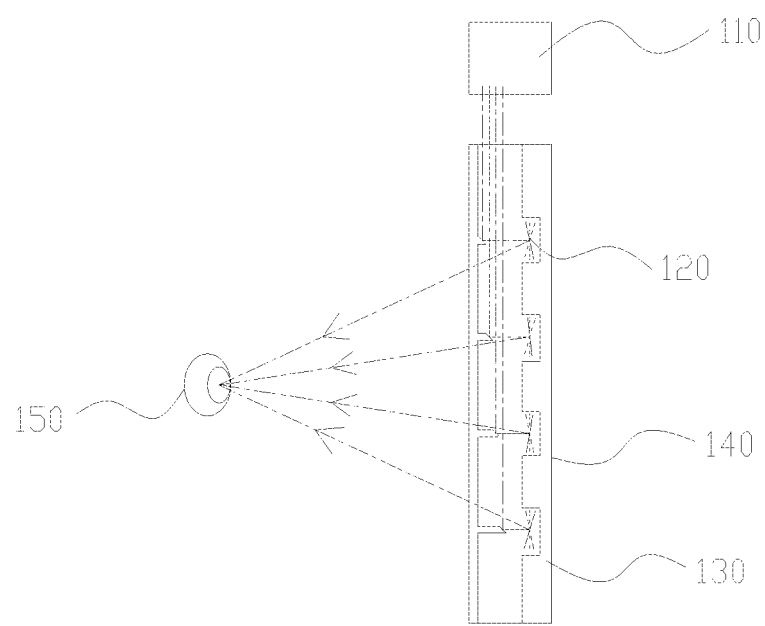
FIG. 7 is a third structural diagram of the near-eye display device with the light source module and the optical module arranged separately according to an embodiment of the present disclosure.

Referring to FIGS. 1 to 7, an embodiment of the present disclosure provides a near-eye display device. As shown in FIG. 1, the near-eye display device includes:

a light source module 110 and an optical module 130.

In the embodiment of the present disclosure, the light source module 110 includes multiple laser image sources 160. The laser image sources 160 are vertical-cavity surface-emitting laser (VCSEL) image sources or collimated light image sources. The optical module 130 has a compound eye optical structure.

The light source module 110 is configured to: perform digital-to-analog (D-A) conversion on an image signal and load the image signal into the laser image sources 160, such that the laser image sources 160 emit red, green, and blue (RGB) laser beams.

In the embodiment of the present disclosure, the light source module 110 processes the image signal into a serial signal, and loads the serial signal into the laser image sources 160 after the D-A conversion to form multiple groups of RGB laser beams. The multiple groups of RGB laser beams each correspond to one projection element 120, or the multiple groups of RGB laser beams jointly correspond to one projection element 120. Each group of RGB laser beams is used as a light source and cooperates with the deflection of each projection element 120, so as to image information corresponding to the image signal on the user's eye.

The optical module 130 includes a compound eye control chip 140 and a projection element array 170. The projection element 120 adopts a three-dimensional (3D) micro-polarizer or a 3D scanning mechanism.

In the embodiment of the present disclosure, the compound eye control chip 140 and the projection element array 170 are provided on the optical module 130. The projection element array 170 includes multiple projection elements 120. The multiple projection elements 120 are arranged on the compound eye control chip 140 according to a preset arrangement pattern. Each projection element 120 in the projection element array 170 is connected to the compound eye control chip 140. The compound eye control chip 140 controls the deflection angles of the projection elements 120 separately according to an actual need, so as to reflect (or directly emit and project) the RGB laser beam emitted by the corresponding laser image source 160 to a human eye 150 (user's eye) through the projection element 120.

The optical module 130 is configured to: separately control the projection elements 120 to rotate within a preset angle through the compound eye control chip 140, so as to project the RGB laser beams emitted by the corresponding laser image sources 160 to the user's eye through each projection element 120.

In the embodiment of the present disclosure, the serial laser image signal is synchronized with the deflection angle of the projection element 120 controlled by the compound eye control chip 140. For example, when the projection element 120 is rotated 50° to the right from a reference plane (a plane perpendicular to a line of a 0° viewing angle), the laser image projected on the projection element 120 is one at the left with a 50° viewing angle. The projection element 120 rotates at a high speed, and the compound eye optical structure composed of the multiple regularly arranged projection elements 120 in front of the human eye reflects the light of the full viewing angle to the human eye 150. In this way, the human eye can see the complete picture.

It should be noted that the geometric dimensions of the laser image source 160 are in the order of micrometers or even smaller than one micrometer, which will not cause any impact on the line of sight of the user. The image signal is loaded into a laser to form a laser beam, such that the laser becomes the laser image source. The laser beams are projected onto the retina of the human eye through the projection elements 120 to form the complete image.

In the near-eye display device provided by the embodiment of the present disclosure, the laser image sources 160 of the light source module 110 emit the RGB laser beams. The compound eye control chip controls the deflection angles of the projection elements 120, so as to project the RGB laser beams emitted by the laser image sources 160 to the eyes of the user through the projection elements 120. The laser beams do not need to undergo multiple times of reflection or refraction before reaching the human eye, which greatly reduces the volume of the near-eye display device and reduces the beam projection angle error, thereby effectively improving the user experience.

In an embodiment, the light source module 110 and the optical module 130 are arranged separately. Each projection element 120 reflects the RGB laser beam emitted by the laser image source 160 to the user's eye by means of light reflection.

In this embodiment, the projection element 120 is coated with a light reflection film. The laser image source 160 is provided beside the projection element 120. The geometrical dimensions of the laser image source 160 and the projection element 120 are in the order of micrometers, so the overall thickness is within one millimeter.

In an embodiment, the light source module 110 and the optical module 130 are arranged integrally. Each projection element 120 projects the RGB laser beam emitted by the laser image source 160 to the user's eye by direct emitting.

In this embodiment, the laser image source 160 is directly provided on the projection element 120. The projection element 120 is changed from a reflective mode to a direct emitting mode, so as to directly project the laser beam of the laser image source 160 onto the human eye.

It should be noted that, the light source module 110 and the optical module 130 may be arranged separately or integrally. The two arrangements have their own advantages and disadvantages in terms of manufacturing process. The separate arrangement simplifies the control circuit of the polarizer, while the integral arrangement simplifies the structure of the optical path. However, it should be noted that the imaging effects of the separated and integral arrangements are almost the same.

In an embodiment, the projection elements 120 and the laser image sources 160 have a one-to-many correspondence.

In the embodiment of the present disclosure, when the RGB laser beams are formed by the laser image sources 160, the multiple groups of RGB laser beams each may correspond to one projection element 120, or the multiple groups of RGB laser beams may jointly correspond to one projection element 120. It is understandable that, compared with the design that the projection elements 120 individually correspond to one laser image source 160, when the projection elements 120 and the laser image sources 160 are configured in a one-to-many correspondence, the luminous flux of the RGB laser beams is relatively larger, which can increase the imaging brightness.

In an embodiment, the compound eye control chip 140 includes a base and a control circuit. The control circuit is prepared on the base.

In this embodiment, the base of the compound eye control chip 140 is made of a transparent material combined with a semiconductor material. The compound eye control chip 140 is fabricated by preparing a control circuit through photolithography or a process with a processing precision equivalent to that of photolithography. The compound eye control chip 140 is connected to each projection element 120, and is configured to control the projection element 120 to rotate at a high speed, such that the human eye 150 can obtain a larger field of view (FOV).

In an embodiment, the preset arrangement pattern includes an equilateral triangle, a square and a rectangle.

In an embodiment of the present disclosure, the projection element array 170 may include multiple projection elements 120. The arrangement patterns of the projection elements 120 may be different, and include regular arrangements such as an equilateral triangle, a square and a rectangle.

In an embodiment, the preset angle is 0-180°.

In the embodiment of the present disclosure, the laser image source 160 may be directly provided on the projection element 120 or beside the projection element 120. To expand the FOV, it is only necessary to increase the number, deflection angle and distribution area of the projection elements 120, such that the projection elements 120 rotate at an angle of 0-180° with the incident beam. In this way, the human eye can see images with a FOV that is infinitely close to 180°.

Compared with the prior art, the embodiments of the present disclosure have the following beneficial effects:

1. The thickness of the lens can be within 1 mm, which is a low thickness that cannot be achieved by the existing near-eye display products.

2. Although the existing arrayed waveguide technology can achieve a low thickness, it cannot achieve a large FOV, and the diagonal FOV is less than 50°. In contrast, the FOV of the near-eye display device of the embodiment of the present disclosure easily exceeds 120°, which is larger than that of the existing VA/AR products.

3. The existing diffractive waveguide technology can achieve a low thickness, but its color purity is very poor, and the dispersion and rainbow phenomena are still unsolved in the world. The embodiment of the present disclosure adopts a laser image signal. Because the bandwidth of each monochromatic laser is very narrow, the color purity of the image is greatly improved, and a more brilliant composite color can be realized. The laser image signal is also used in the field of diffractive waveguide technology, but due to differences in diffraction angles of different colors, serious dispersion occurs. The optical path of the compound eye structure of the embodiment of the present disclosure avoids diffraction, so the original color purity of the laser signal is preserved.

4. The existing BirdBath (BB) solution only has the advantage of bright colors, and there is no eyebox design. If the eye is moved up and down, left and right, the image is distorted. In addition, although the volume of the device in this solution is smaller than that of VR and freeform AR, it cannot minimize the thickness to 15 mm. In the embodiment of the present disclosure, each polarizer has the function of displaying a complete picture. For images from all viewing angles, there is light reflection from each projection element, so the entire compound eye structure has an eyebox in all directions.

5. In all existing VR/AR using laser image sources, millimeter-sized lenses are used for collimation processing in the optical path, and multiple times of reflection are performed through millimeter-sized prisms. The design results in a huge overall size, and the comprehensive angle error after multiple times of reflection is large. The embodiment of the present disclosure adopts the laser image source 160 with a size of micron scale, and performs the plane reflection at most once. The embodiment of the present disclosure can reduce the overall thickness to less than one millimeter, and control the angle error of the image source within 1".

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

The invention claimed is:

1. A near-eye display device, comprising:
   a light source module and an optical module, wherein
   the light source module comprises multiple laser image sources, which are vertical-cavity surface-emitting laser (VCSEL) image sources or collimated light image sources;
   the light source module is configured to: perform digital-to-analog (D-A) conversion on an image signal and load the image signal into the laser image sources, such that the laser image sources emit red, green, and blue (RGB) laser beams;
   the optical module comprises a compound eye control chip and a projection element array;
   the projection element array comprises multiple projection elements, which are arranged on the compound eye control chip according to a preset arrangement pattern and adopt 3D scanning mechanisms; and
   the optical module is configured to: control the projection elements to rotate within a preset angle through the compound eye control chip, so as to project the RGB laser beams emitted by the laser image sources directly to a user's eye through the projection elements; wherein the multiple regularly arranged projection elements form a compound eye optical structure which reflects the RGB laser beams of full-viewing angle to the user's eye.

2. The near-eye display device according to claim 1, wherein the light source module and the optical module are arranged separately; and the projection elements project the RGB laser beams emitted by the laser image sources to the user's eye by means of light reflection.

3. The near-eye display device according to claim 1, wherein the light source module and the optical module are arranged integrally; and the projection elements project the RGB laser beams emitted by the laser image sources to the user's eye by direct emitting.

4. The near-eye display device according to claim 1, wherein the projection elements and the laser image sources have a one-to-many correspondence.

5. The near-eye display device according to claim 1, wherein the compound eye control chip comprises a base and a control circuit; and the control circuit is prepared on the base.

6. The near-eye display device according to claim 1, wherein the preset arrangement pattern comprises an equilateral triangle, a square and a rectangle.

\* \* \* \* \*